United States Patent Office 3,847,875
Patented Nov. 12, 1974

3,847,875
POLYAMIDES FROM HEPTADECANE DICARBOXYLIC ACID AND HETEROCYCLIC POLYAMINE
Manfred Drawert, Werne, and Eugen Griebsch, Unna, Germany, assignors to Schering AG, Berlin and Burgkamen, Germany
No Drawing. Filed Sept. 20, 1972, Ser. No. 290,438
Claims priority, application Germany, Sept. 28, 1971, P 21 48 264.4
Int. Cl. C08g 20/20
U.S. Cl. 260—78 R  3 Claims

ABSTRACT OF THE DISCLOSURE

Polyamide resins, useful as hot melt adhesives of low melt-viscosity, particularly as adhesives for plasticized polyvinyl chloride. The resins are formed between heptadecane dicarboxylic acid and certain aminoalkyl piperidines, dipiperidyl alkenes, or dipiperazyl alkenes. The resins may also include an optional codicarboxylic acid, such as azelaic acid, and/or an optional codiamine, such as ethylene damine. Method of making these resins by condensing the acid and amine components.

POLYAMIDES COMPRISING HEPTADECANE DICARBOXYLIC ACID

The present invention relates to polyamides comprising heptadecane dicarboxylic acid, and to their preparation.

Hot melt adhesives for the adhesion of vinyl polymers are already known in the art from U.S. Pats. 3,377,303 and 3,565,837. The polyamides disclosed in these patents comprise polymeric acids, codicarboxylic acids, and dipiperidyl alkanes or dipiperazyl alkanes and piperazine in combination with other diamines.

These polyamides are particularly suitable for the adhesion of polyvinyl chloride containing plasticizers. However, good adhesion values can only be achieved with polyamide resins of high viscosity. Working with these resins is difficult because of their high viscosities.

On the other hand, if the melt viscosities of the polyamides disclosed in the above-identified patents are decreased, then a decrease in the adhesion values is observed depending on content of plasticizer in the polyvinyl chloride.

The adhesive property of the aforementioned polyamides depends not only on the melt viscosity of the adhesive to be employed for adhesion and on the plasticizer content of the polyvinyl chloride to be adhered, but also on the kind of of polyamines present in the adhesive. The best results are obtained with dipiperidyl alkanes or dipiperazyl alkanes. In contrast, if mononuclear disecondary diamines such as piperazine or alkyl substituted piperazines are employed, the adhesive property decreases in comparison with that of polyamides comprising binuclear disecondary diamines.

Polyamides comprising heptadecane dicarboxylic acid are also known in the art. German patent publications 1,050,053 and 1,144,919, for example, disclose the preparation of transparent polyamides which form stable solutions in organic solvents. Although the polyamides described in the first-mentioned patent are inter alia also recommended as adhesives, none of the polycondensates disclosed therein adhere plasticized polyvinyl chloride.

The polyamides of the present invention are condensation products of 1,8- or 1,9-heptadecane dicarboxylic acid with one or more heterocylclic diamines or polyamines of the formula (1)

X—N=A=N—H wherein A is the radical

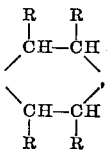

or

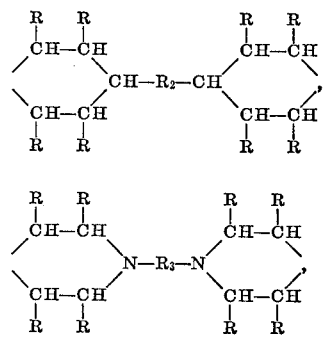

or

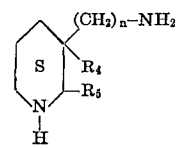

where X is hydrogen or $H_2NR''$— and $R''$ is a divalent alkylene radical having 1–6 carbon atoms, $R_2$ is a divalent alkylene radical having 1–8 carbon atoms, $R_3$ is a divalent alkylene radical having 2–12 carbon atoms, and R is hydrogen or an alkyl radical having 1–4 carbon atoms, or of the formula (2)

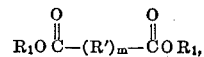

wherein $R_4$=hydrogen or an alkyl radical having 1–4 carbon atoms, $R_5$=hydrogen or —$CH_3$, $n$=1 or 3.

The polyamides may optionally comprise a codicarboxylic acid of the formula

wherein $m$ is 0 or 1, R' is a divalent aliphatic radical having 1–12 carbon atoms, or a cycloaliphatic, aromatic, or araliphatic radical having up to 8 carbon atoms, these radicals preferably being unsubstituted, and wherein $R_1$ is hydrogen or an aliphatic or aromatic hydrocarbon radical having up to 8 carbon atoms. The amine component, also, may comprise an optional codiamine of the formula $H_2N$—$R_6$—$NH_2$, wherein $R_6$ is an aliphatic, cycloaliphatic, aromatic, or araliphatic hydrocarbon radical having 2–20 carbon atoms, particularly 2–12 carbon atoms.

The polyamides are prepared by reacting substantially equivalent amounts of the acid and amine components (the acids may be reacted per se or in the form of their esters) at temperatures between 180° C. and 280° C. with cleavage of water or alcohols.

In a preferred embodiment, the heptadecane dicarboxylic acid is condensed with the heterocyclic diamine component in a first step and the pre-condensate is then further reacted with the optional comonomers, i.e. the codicarboxylic acids and/or the codiamines.

The polyamides so produced are useful as hot melt adhesives for the adhesion of plastics and other materials, particularly plasticized polyvinyl chloride.

The 1,8- or 1,9-heptadecane dicarboxylic acids can be prepared according to known methods by the carboxylation of oleic acid (cf. German patent publication 1,006,-849), whereby as a rule a mixture of the isomers in a 50:50 ratio is formed. Either isomer or mixtures of the isomers in any proportion can be used in the present invention.

As examples of heterocyclic amines of the formula (1) to be condensed with such acids, the following dipiperidyl compounds, *inter alia*, can be mentioned as exemplary: 1,3-di-(4-piperidyl)-propane; 1,2-di-(4-piperidyl)-ethane; and 1,4-di-(4-piperidyl)-butane. Exemplary N,N'-dipiperazyl compounds include: N,N'-dipiperazyl ethane; N,N'-dipiperazyl propane; N,N'-dipiperazyl hexane; and N,N'-dipiperazyl dodecane. In addition, piperazine and N-aminoethyl-piperazine can be mentioned.

As examples of suitable heterocyclic amines of the formula (2), 2,3-dimethyl - 3 - (3-aminopropyl)-piperidine, which is obtained by the bis-cyanoethylation of methyl ethyl ketone with subsequent cyclizing hydrogenation, or 3-aminomethyl piperidine, which is obtained by the reaction of methylene glutaronitrile with ammonia with a subsequent cyclizing catalytic reduction, can be named.

As codicarboxylic acids, azelaic acid, sebacic acid, and terephthalic acid are preferred.

As co-diamines, ethylene diamine is preferred. Other amines are hexamethylene diamine; 1 - amino - 3 - aminomethyl - 3,5,5 - trimethyl - cyclohexane (isophorone diamine); and diaminodiphenylmethane.

The polyamides according to the invention differ from hot melt adhesives comprising dimeric fatty acids in that the former give outstanding adhesion values on strongly plasticized polyvinyl chloride even at low melt viscosity which consequently imparts easier workability. A further advantage of the polyamides according to the invention is that the use of more readily obtainable mononuclear disecondary amines such as piperazine in the polyamides leads to outstandingly good adhesion values.

The ratio of equivalents of heptadecane dicarboxylic acid to the equivalents of optionally employed codicarboxylic acid can reach the value 0.1:0.9 and is generally between 0.9:0.1 to 0.1:0.9. A ratio between 07:0.3 and 0.6:04 is preferred. The ratio of mols of heterocyclic amine employed to the mols of optionally-employed codiamine can also reach 01:0.9 and is generally between 0.9:0.1 and 0.1:0.9. A ratio between 0.5:0.5 and 0.6:04 is preferred. By the use of codicarboxylic acids or codiamines, the properties such as flexibility, hardness, softening point, and the like can be adjusted to desired values.

It is surprising that the adhesive properties of the polyamides of the invention comprising $C_{19}$-dicarboxylic acids do not depend on the kind of heterocyclic amines therein, as is observed in prior art polyamides comprising dimeric fatty acids. Thus, for example, a polyamide according to the present invention having a melt viscosity of 30 poises at 200° C. and which comprises heptadecane dicarboxylic acid, azelaic acid, ethylene diamine, and piperazine, shows an adhesion value of 2 kilograms of force/centimeter (kgf./cm.) on a polyvinyl chloride film. An analogous product comprising heptadecane dicarboxylic acid in which the piperazine is replaced by 4,4'-dipiperidyl propane-1,3 gives similarly good adhesion values at a comparable viscosity.

A better understanding of the present invention and of its many advantages will be had by referring to the following specific examples given by way of illustration.

EXAMPLE 1

500 g. of heptadecane dicarboxylic acid (0.6 equivalent part) were mixed in a three-necked flask equipped with a stirrer, thermometer, and condenser, with 194.5 g. of azelaic acid (0.4 equivalent part), 120 g. of piperazine (0.5 equivalent part), and 1.25 g. of triphenylphosphite as an amidation catalyst (0.25 percent, by weight of the heptadecane dicarboxylic acid). The mixture was heated over a period of two hours to a temperature of 260° C. under an atmosphere of nitrogen. The temperature of 260° C. was maintained for six hours. After four hours, a vacuum of 20 mm. Hg was applied.

The precondensate so obtained was warmed, after prior cooling, to 60° C., combined with 77.1 g. of ethylene diamine (0.5 equivalent part), and again heated to 260° C. over a period of two hours and maintained for a further six hours at this temperature. Again, a vacuum of 20 mm. Hg was applied during the last two hours.

The polyamide resin so obtained has the following properties:

Ring and ball softening point=132° C.
Amine number=2.3
Acid number=6.1
Viscosity at 200° C.=110 poises.

Strips of plasticized polyvinyl chloride three centimeters wide having a plasticizer content of 25 percent or 40 percent were adhered with the aforementioned polyamide resin and their adhesion values were determined. In both cases, failure of the material was observed.

Examples 2–5 were carried out in an analogous fashion and the results are reported in following Tables I and II.

Examples 6–8 in the Tables relate to comparative samples prepared by admixing the raw materials, with the exception of the ethylene diamine, to a temperature of 60° C., at which point the amounts of ethylene diamine shown in Table I were combined. The reaction mixture was heated to 230° C. over a period of 2 hours with stirring and under nitrogen and maintained at this temperature for six hours. After four hours, a vacuum of 20 mm. Hg was applied.

TABLE I

| Example: | Heptadecanedicarboxylic acid | | Codicarboxylic acid | | | Diamine | | Codiamine (ethylenediamine) | |
|---|---|---|---|---|---|---|---|---|---|
| | Grams | Eq. parts | | Grams | Eq. parts | | Gram | Eq. parts | Grams | Eq. part |
| 2 | 200 | 0.4 | Azelaic | 175 | 0.6 | Piperazine | 87 | 0.6 | 37 | 0.4 |
| 3 | 1,000 | 0.65 | ...do... | 314 | 0.35 | ...do... | 221.5 | 0.5 | 142.5 | 0.5 |
| 4 | 114 (and 6 g. stearic) | 0.5 | ...do... | 68.4 | 0.5 | 1,3-di-(4-piperidyl)-propane. | 77.2 | 0.5 | 21.7 | 0.5 |
| 5 | 114 (and 6 g. stearic) | 0.5 | Sebacic | 73.0 | 0.5 | 1,2-di-(4-piperazyl)-ethane | 81.7 | 0.5 | 21.7 | 0.5 |
| | Dimeric fatty acid (96%) | | | | | | | | | |
| Comparative example: | | | | | | | | | | |
| 6 | 300 | 0.67 | ...do... | 52.4 | 0.33 | 1,3-di-(4-piperidyl)-propane. | 88.0 | 0.5 | 24.6 | 0.5 |
| 7 | 281 (and 19 g. of Tall oil fatty acid) | 0.67 | ...do... | 52.4 | 0.33 | ...do... | 88.0 | 0.5 | 24.6 | 0.5 |
| 8 | 200 | 0.8 | Adipic | 12.8 | 0.2 | Piperazine | 18.9 | 0.5 | 13.2 | 0.5 |

TABLE II

| | Amine number | Acid number | Viscosity, 200° C. (poises) | Softening point (Ring and Ball) (° C.) | Adhesion on polyvinyl chloride containing— | |
|---|---|---|---|---|---|---|
| | | | | | 25% plasticizer (kgf./cm.) | 40% plasticizer (kgf./cm.) |
| Example: | | | | | | |
| 2 | 2.0 | 8.3 | 109 | 152 | M | M |
| 3 | 2.4 | 7.5 | 31 | 117 | 4 | 2.2 |
| 4 | 1.1 | 4.4 | 168 | 146 | | 5.3 |
| 5 | 1.0 | 4.1 | 166 | 135 | | 3.5 |
| Comparative example: | | | | | | |
| 6 | 8.0 | 1.1 | 151 | 141 | 4.3 | 3.1 |
| 7 | 7.4 | 2.5 | 21 | 140 | 1.3 | (¹) |
| 8 | 1.4 | 3.4 | | 135 | 1.8 | 0.7 |

¹ No adhesion.
M=material failure.

What is claimed is:

1. A polyamide resin consisting essentially of the polymeric condensation product of substantially equivalent amounts of
    (1) an aliphatic dicarboxylic acid component consisting essentially of
        (a) an isomeric mixture of 1,8- and 1,9-heptadecane dicarboxylic acids and
        (b) mixtures of (a) with a codicarboxylic acid of the formula

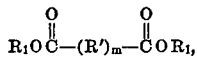

wherein R' is a divalent aliphatic group having 1 to 12 carbon atoms, $R_1$ is hydrogen or an aliphatic hydrocarbon group having up to 8 carbon atoms, and $m$ is 0 or 1, said codicarboxylic acid being present in said mixtures in an amount up to 9 equivalent parts per equivalent part of heptadecane dicarboxylic acid, and
    (2) a diamine or polyamine component consisting essentially of
        (a) at least one heterocyclic diamine or polyamine selected from the group consisting of
            (i) amines of the formula X—N=A=NH and
            (ii) amines of the formula

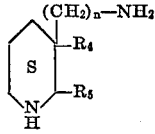

wherein A is

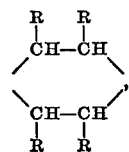

or

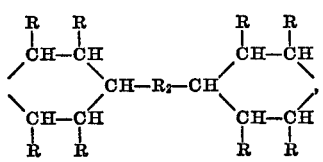

or

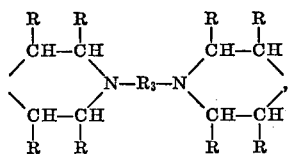

X is hydrogen or —R"NH₂ and R" is alkylene having 1 to 6 carbon atoms; $R_2$ is alkylene having 1 to 8 carbon atoms; $R_3$ is alkylene having 2 to 12 carbon atoms; R is hydrogen or alkyl having 1 to 4 carbon atoms; $R_4$ is hydrogen or alkyl having 1 to 4 carbon atoms; $R_5$ is hydrogen or methyl; and $n$ is 1 or 3; and
        (b) mixtures of (a) with an aliphatic codiamine of the formula $H_2$—N—$R_6$—$NH_2$, wherein $R_6$ is an aliphatic hydrocarbon group having 2 to 20 carbon atoms, said codiamine being present in an amount up to 9 equivalent parts per equivalent part of heterocyclic diamine or polyamine.

2. The polyamide as in claim 1 wherein the ratio of equivalents of heptadecane dicarboxylic acid to equivalents of codicarboxylic acid in said acid component is between 0.9:0.1 and 0.1:0.9.

3. The polyamide as in claim 1 wherein the ratio of equivalents of heterocyclic diamine or polyamine to equivalents of codiamine is between 0.9:0.1 and 0.1:0.9.

References Cited

UNITED STATES PATENTS

| 2,953,548 | 9/1960 | Schott et al. | 260—78 R |
| 3,143,527 | 8/1964 | Wittbecker | 260—78 R |
| 3,463,847 | 8/1969 | Veda et al. | 260—78 R |
| 3,565,837 | 2/1971 | Drawert et al. | 260—78 R |

FOREIGN PATENTS

| 1,050,053 | 2/1959 | Germany. |
| 1,144,919 | 3/1963 | Germany. |

HAROLD D. ANDERSON, Primary Examiner

U.S. Cl. X.R.

161—227